United States Patent [19]

Morash

[11] Patent Number: 5,017,056
[45] Date of Patent: May 21, 1991

[54] POSITIONER FOR ACCURATELY DRILLING A HOLE IN A TOOL BALL PAD

[75] Inventor: Dean C. Morash, Huntington Beach, Calif.

[73] Assignee: Northrop Corporation, Hawthorne, Calif.

[21] Appl. No.: 222,459

[22] Filed: Jul. 21, 1988

[51] Int. Cl.$^5$ ............................................. B23B 35/00
[52] U.S. Cl. .................. 408/1 R; 408/115 R; 408/75; 408/72 R; 33/638; 33/644
[58] Field of Search ........... 408/115 R, 115 B, 241 B, 408/241 G, 1 R, 88, 16, 75, 72 R; 33/568, 573, 638, 644, 642, 613, 679; 269/119, 118, 111, 16

[56] References Cited

U.S. PATENT DOCUMENTS

| | | | |
|---|---|---|---|
| 2,342,033 | 2/1944 | Barabas | 408/115 X |
| 2,535,581 | 12/1950 | Morash | 408/88 |
| 2,834,233 | 5/1958 | Anderson | 408/75 |
| 3,157,068 | 11/1964 | Rickert | 408/75 |
| 3,465,620 | 9/1969 | Hilburn | 408/115 |
| 4,813,820 | 3/1989 | Cadwell et al. | 408/75 X |

FOREIGN PATENT DOCUMENTS

| | | | |
|---|---|---|---|
| 611344 | 2/1935 | Fed. Rep. of Germany | 269/118 |
| 1195931 | 11/1959 | France | 269/118 |
| 87414 | 3/1920 | Switzerland | 269/118 |

OTHER PUBLICATIONS

Anonymous disclosure 27428.

Primary Examiner—Larry I. Schwarz
Assistant Examiner—R. Schultz
Attorney, Agent, or Firm—Terry J. Anderson; Robert B. Block

[57] ABSTRACT

A tool ball pad hole positioner is provided which includes first plate which is securely positionable with respect to a jig and has a large aperture therein; a second plate which is movable with respect to the first plate and has a small circular aperture therein overlying the large aperture; a target which is removably receivable within the small hole and able to be sighted by an optical device for determining the precise location of the target as well as the small aperture with respect to the precise location on the jig. The first plate is positively secured to the jig and the second plate is shifted and releasably clamped with respect to the first plate with respect to the first plate. Also disclosed is the method of drilling a hole in a tool ball pad with the tool ball pad hole positioner.

5 Claims, 2 Drawing Sheets

POSITIONER FOR ACCURATELY DRILLING A HOLE IN A TOOL BALL PAD

BACKGROUND OF THE INVENTION

1. Field Of The Invention

This invention relates to a tool ball pad hole positioner and, more particularly, to a method and apparatus for drilling a precisely positioned hole in a tool ball pad attached to a tool jig

2. Description Of The Background Art

A tool jig is a device used to position and hold workpieces during machining operations such as drilling, cutting or the like and to guide a tool for such machining operations. A jig may also be used to position many parts to create an assembly. The jig is provided with critically located part index holes and with abutment surfaces in order to effect the positioning of such workpieces. If the holes and abutment surfaces of the jig are not located properly, the workpieces produced in such jig will not meet their engineering design requirements.

The process of providing holes on jigs is normally effected through a tool ball pad with a preformed hole coupleable to the jig. After the tool ball pad has been properly positioned, c-clamps secure the pad in position on the jig while drilling the pad-to-jig attachment apertures. Skilled manpower normally use hammers to tap the pad into position prior to drilling for attachment. This is an inefficient use of skilled manpower and is not time effective or overly accurate. Unfortunately, this procedure has been standard practice in the fabrication of the majority of master and assembly tools throughout the commercial and military aircraft industries. On the average, the entire process to locate and attach the pad to a jig, within plus or minus 0.001 inches in two axes, takes from two to two and a half hours. A typical master jig will require between four and six tool pads while an average assembly jig will utilize a dozen or more of such pads.

A tool ball pad is a hardened steel rectangular block generally measuring two by two and a half by one-half inches with an 0.250 inch diameter through hole in its center. This standard piece of hardware is commonly used during the fabrication of a jig to establish a reference system. The pad, with its 0.250 inch hole located at the center, is positioned on the jig. A target, such as a tooling ball or a theodolite target, is placed in the hole and the pad is moved to position the target to the intended predetermined location shown on the tool design. The position of the target is determined using conventional optics or computer aided theodolites. When the desired position of the hole is obtained, the pad is clamped to the rough surface of the jig. Attachment apertures are drilled and tapped through the corners of the pad into the rough structure of the jig. Fasteners and pins are then installed rendering the pad secure to the jig with the hole of the pad in the proper location on the jig.

Problems exist with the present method since it is difficult to clamp the pad securely to the rough structure of the jig in a fashion which prevents inadvertent movement while allowing for intentional movement during positioning of the pad and hole. Another problem is moving the pad a precise amount in one axis without affecting its position in the other axis. The presently utilized industry method requires striking a hammer against the tool ball pad with an educated amount of force and direction to produce the desired result. To be expeditious, this practice requires experience.

Another presently encountered problem is obtaining sufficient clamping pressure to prevent inadvertent movement of the tool pad during drilling and tapping of the jig In addition, inadvertent movement between pad and jig often occurs during the application of the clamping forces. Further, irregularities o the surface of jig where the pad is attached causes displacement of the pad as it is being tightened down.

Lastly, the depth of the attachment apertures in tool ball pads presently available to guide the drill is merely 0.125 inches due to a 0.375 inch deep counter bore for the bolt head. This depth is inadequate if drilled holes, concentric with the center line of the pad holes, are going to be produced. If concentricity is not maintained, the bolts will thread into the pad and jig structure at an angle and change the position of the pad as it is being tightened down. Presently, only skilled mechanics are capable of producing holes in the jig that are concentric with the holes in the pads.

Various approaches are disclosed in the patent literature for the positioning of one part with respect to another. Note, for example, U.S. Pat. No. 3,775,857 to Handy and U.S. Pat. No. 4,425,076 to Colineau. Neither of these patents, however, are capable for use in drilling holes in a jig through a tool ball pad hole positioner as contemplated herein. The patent to Handy discloses a tool intended to be used to simplify the indexing of materials to be machined on a numerically controlled machine tool. It offers no provision to locate a tool ball pad hole positioner and an optical target in the manufacturing of jigs The patent to Colineau has, for its purpose, the arcuate positioning and securement of electrical components to a work table during the assembly of an electrical circuit. Thus, it cannot aid in the positioning and securing of a tool ball pad hole positioner to the rough structure of a jig.

As illustrated by a large number of prior patents and commercial devices, efforts are continuously being made in an attempt to improve apparatus and methods for positioning one component with respect to the other. Such efforts are being made to render such positioning more efficient, reliable, inexpensive and convenient to use. None of these previous efforts, however, provides the benefits attendant with the present invention. Additionally, the prior patents and commercial devices do not suggest the present inventive combination of method steps and component elements arranged and configured as disclosed and claimed herein. The present invention achieves its intended purposes, objects and advantages through a new, useful and unobvious combination of method steps and component elements, with the use of a minimum number of functioning parts, at a reasonable cost to manufacture and use, and by employing only readily available materials.

Therefore, it is an object of this invention to provide an improved tool ball pad hole positioner which comprises a first plate which is securely positionable with respect to a jig and has a large aperture therein; a second. plate which is movable with respect to the first plate and has a small circular aperture therein over lying the large aperture; a target which is removably receivable within the small aperture and able to be sighted by an optical device for determining the precise location of the target as well a the aperture with respect to the precise location on the jig; means to positively secure the first plate to the jig; means to shift the second plate with respect to the first plate and means to releasably clamp the second plate with respect to the first plate.

It is a further object of this invention to provide an improved method of drilling a hole in a tool ball pad blank secured to a jig at a precise predetermined location as by the above described apparatus.

It is yet a further object of this invention to drill holes in tool ball pads positively secured to jigs at precise positions through improved tool ball pad hole positioners.

Lastly, it is an object of the present invention to accurately shift an aperture in a tool ball pad hole positioner in order to locate a predetermined location for a hole to be drilled.

The foregoing decision outlines some of the more pertinent objects of the invention. These objects should be construed as merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with the specific embodiment shown in the attached drawings. For the purpose of summarizing the invention, an improved tool ball pad hole positioner is provided which comprises a first plate which is securely positioned with respect to a jig and has a large aperture therein; a second plate which is movable with respect to the first plate and has a small circular aperture therein overlying the large aperture; a target is removably receivable within the small aperture and adapted to be sighted by an optical device for determining the precise location of the target as well as the small aperture with respect to the precise location on the jig. The first plate is positively secured to the jig; means micrometers are provided to shift the second plate with respect to the first plate; and clamp means are provided to releasably clamp the second plate with respect to the first plate. The means to shift the second plate includes a pair of positioner blocks located on the first plate adjacent to two adjacent side edges, each means to shift including a micrometer-like device for moving the drill block in one direction. The clamp means to releasably clamp the second plate includes two clamp blocks adjustably secured to the base plate adjacent to two adjacent edges of the base plate opposite from the first two adjacent side edges. The clamp blocks are secured to the base plate by staked threaded members and nuts with elongated slots in the clamp blocks through which the set screws are positioned.

The invention may also be incorporated into improved apparatus for drilling a hole in a tool ball pad secured to a jig at a precise predetermined location which comprises a tool ball pad hole positioner having a base plate positively secureable in position on a jig overlying the pad to be drilled with a large aperture extending through the base plate with the tool ball pad hole positioner also having a drill plate movable on the base plate with a small circular aperture extending therethrough and overlying the large aperture. A target is removably received within the small circular aperture and is sighted with an optical device adapted to determine the precise location of the target with respect to the predetermined location on the jig and the pad to be drilled. Means on the base plate is provided to shift the drill plate with respect to the base plate to bring the drill plate, small aperture and target into the precise predetermined location on the jig and pad so that the target can be removed from the small aperture so that the drill plate and small aperture may then function as a drill block for the drilling of the pad secured to the drill plate-means are provided on the base plate to clamp the drill plate with respect to the base plate.

Lastly, the invention may be incorporated into an improved method of drilling a hole in a tool ball pad secured to a jig at a precise predetermined location including the steps of: providing a base plate, a drill plate and a target; positively securing the base plate with respect to the jig and tool ball pad secured thereto in the general area adapted to be drilled; adjusting the position of the drill plate with respect t the base plate while the base plate and tool ball pad are secure to the jig; optically sighting the target while in an aperture of the drill plate; adjusting the drill plate with respect to the base plate, tool ball pad and jig until the target has been moved to the precise location overlying the location of the tool ball pad t be drilled; removing the target from the aperture in the drill plate; drilling the tool ball pad through the aperture in the drill plate; and removing the tool ball pad hole positioner from the jig.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific embodiment may be readily utilized as a basis for modifying or designing other methods and structures for carrying out the same purposes of the present invention. It should also be realized by those skilled in the ar that such equivalent methods and structures do not depart from the spirit an scope of the invention a set forth in the appended claims.

BRIEF DESCRIPTION OF THE DRAWINGS

For a fuller understanding of the nature and objects of the invention, reference should be had to the following detailed description taken in conjunction with the accompanying drawings in which.

Similar reference characters refer to similar parts throughout the several Figures.

DETAILED DESCRIPTION OF THE INVENTION

Figure 1:
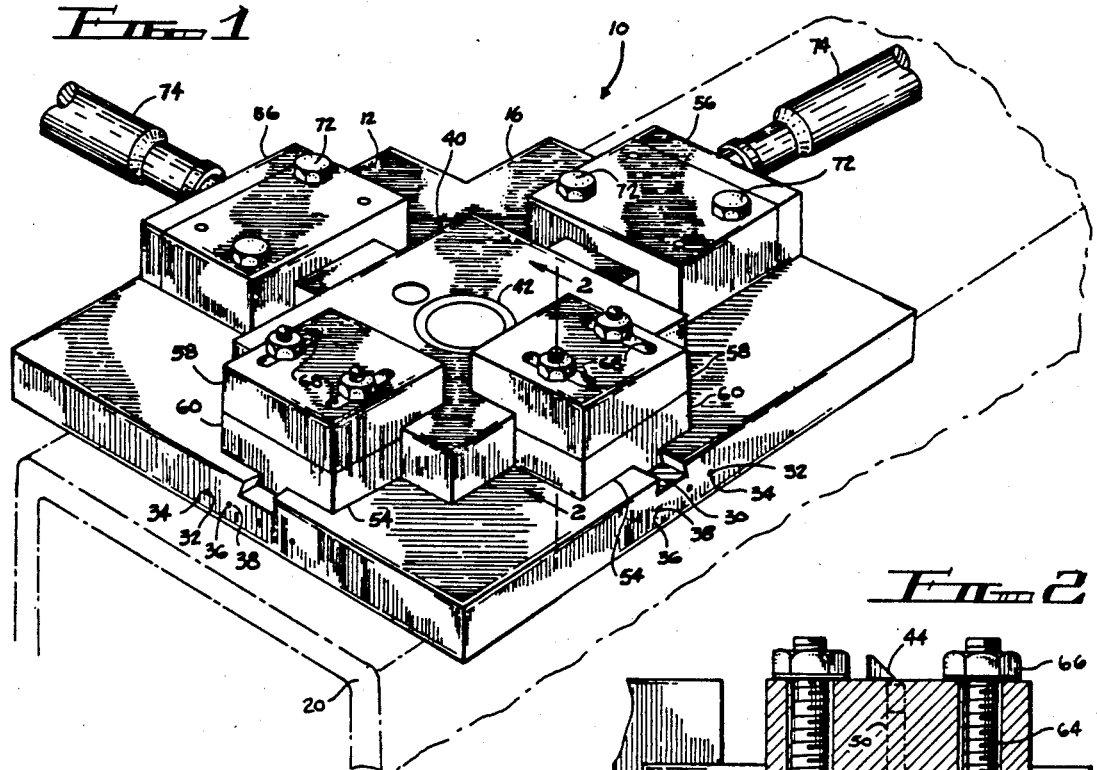
FIG. 1 is a perspective illustration of a tool ball pad hole positioner constructed in accordance with the present invention.
Figure 2:
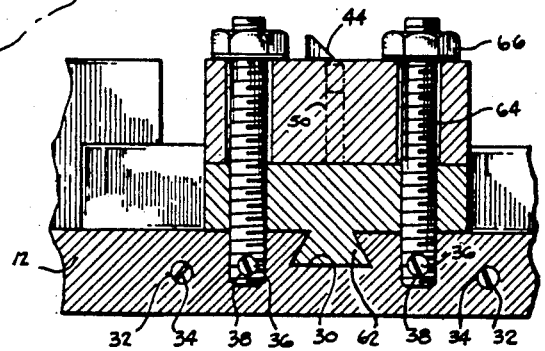
FIG. 2 is a sectional view of the portion of the tool ball pad hole positioner shown in FIG. 1 taken along line 2—2 of FIG. 1.
Figure 3:
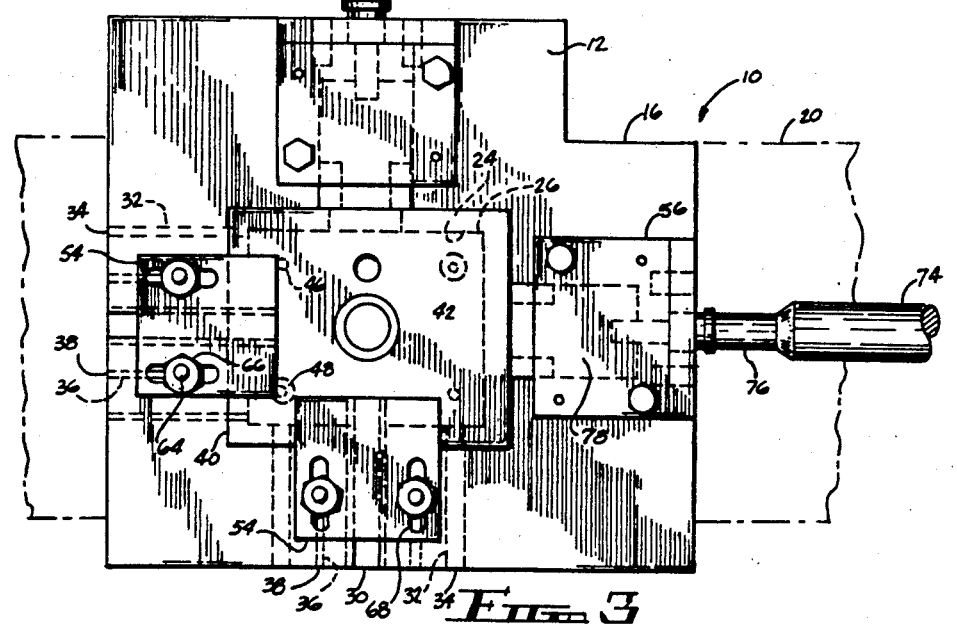
FIG. 3 is a plan view of the tool ball pad hole positioner shown in FIG. 1.
Figure 4:
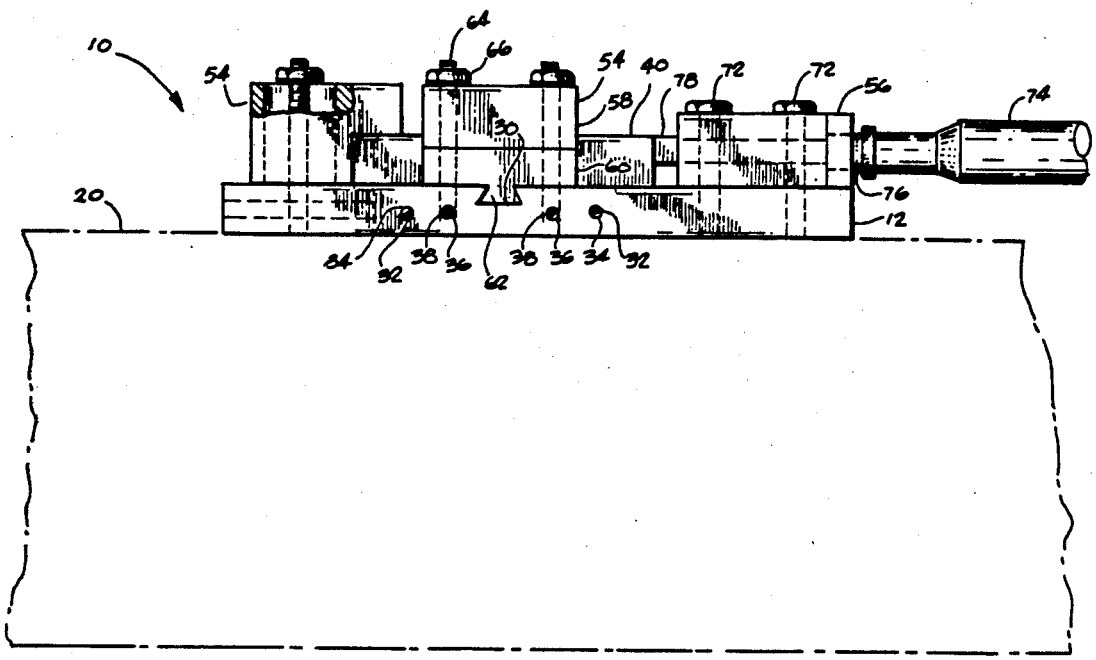
FIGS. 4 and 5 are end and side elevational views of the tool ball pad hole positioner shown in FIG. 1.
Figure 5:
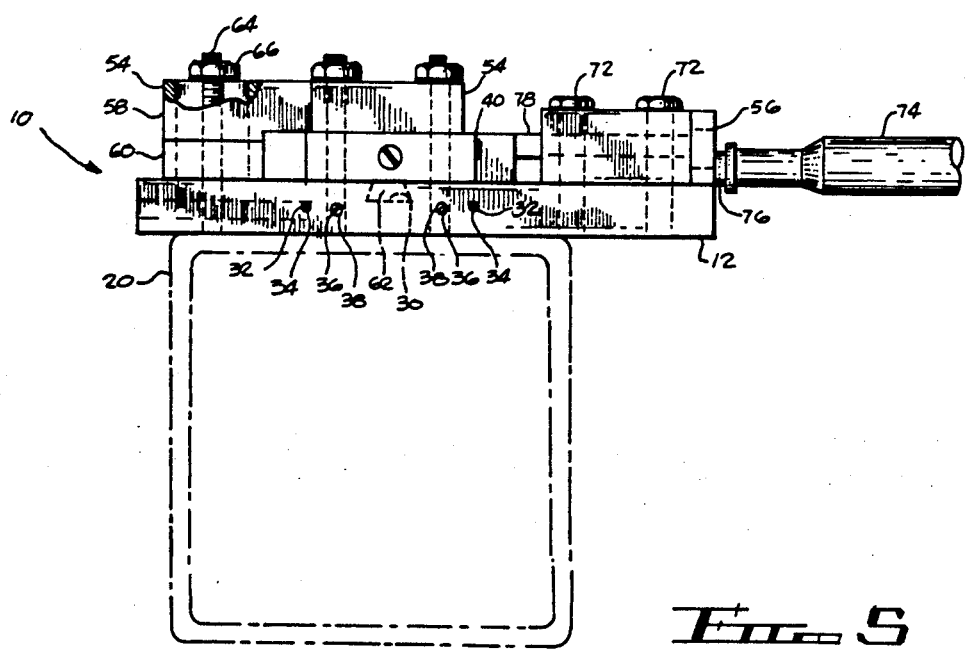

With particular reference to FIG. 1, there is shown a tool ball pad hole positioner 10 constructed in accordance with the principles of the present invention. The positioner includes a base plate 12 fabricated of a generally rectangular configuration with a cut-out 16 in one corner thereof. The base plate 12 is positionable on a jig 20.

Located in the base plate 12 is a central rectangular aperture 24 for receiving a tool ball pad 26 and for the passage of a drill bit therethrough during the drilling of the pad 26. Additional threaded apertures are provided adjacent to each edge for the receipt of set screws for the securing supplemental components to the base plate. Also machined in the base plate are a pair of dovetail slots 30 for the receipt of two of such supplemental components. Lastly, a plurality of apertures 32, two in number, are formed in each of the two edges of the base plate adjacent to the dove tail slots and parallel therewith. Set screws 34, located in apertures 32, may be adjusted by an operator through the use of a screw driver at their exposed exterior ends. Their interior ends contact the tool ball pad 26 at two adjacent edges for securement of the base plate 12 and positioner 10 with respect to the tool ball pad 26.

Positioned on the upper surface of the base plate 12, and of a size substantially smaller than the base plate, is a rectangular drill plate 40. The rectangular drill plate includes a smaller circular central aperture or hole 42, preferably 0.250 inches in diameter, to first constitute a means for holding an optical target 44, and then for constituting a drill block for the drilling of a precisely positioned hole in the tool ball pad 26. The drill plate is not positively attached with respect to the base plate and may, therefore, be laterally shifted with respect thereto.

The tool ball pad 26 without a central hole is first secured to the jig by dowels and bolts, now shown. Tool ball pads are staple items of commerce sold, for example, by Carr Lane of Saint Louis, Mo. and Keuffel & Esser of Morristown, N.J.

The central aperture 42 in the drill plate 40 is of a size to receive an 0.250 inch diameter stem 50 of a theodolite a optical target 44 of the flush type for optical citing purposes during the positioning of the central aperture for subsequent drilling of the pad 26. Thereafter, a 0.500 inch optical ball, known as a construction ball or tool ball, an alternate optical target, with a 0.250 inch diameter stem may be received in a like diameter hole of the pad after drilling to confirm the proper location of the hole. The flush target 44 may be of the type sold by Pacific Manufacturing Sales of Costa Mesa, Calif., as their model P5145-1 while the construction ball may be of the type sold as their model CL-1-CB by Carr Lane.

The supplemental components of the tool ball pad hole positioner 10 include a pair of clamp blocks 54 and a pair of positioner blocks 56. The clamp blocks are located adjacent to contiguous edges of the base plate opposite the cut out 16. They are each formed of an upper portion 58 and a lower portion 60. Each upper portion is positioned to partially overlie and releasably secure the drill plate 40 along two adjacent edges. The lower portion 60 of each clamp block is adapted to be located between the upper portion 58 and the base plate 12. Apertures extend through the upper and lower portions of the clamp blocks in alignment with threaded apertures in the base plate. The lower faces are formed with dove tail projections 62 which are received in the dove tail slots 30 for guiding the movement of the clamp blocks 54. In this manner, the clamp blocks 54 may be secured by a pair of threaded members 64, thread stock with standard nuts 66 for contacting the upper surfaces of the drill plates and releasably holding them securely against movement with respect to the base plate 12. Adjustment of the clamp blocks 54 is effected by forming the apertures 68 in a slotted configuration with the slots extending toward and away from the adjacent edges of the drill plate, radially with respect to the circular aperture 42 in the drill plate.

Located adjacent to the other two edges of the base plate 12 and drill plate 40 are a pair of positioner blocks 56. The positioner blocks are fixedly attached to the base plate by apertures extending through the positioner blocks and aligned with threaded apertures in the base plate. Attachment is maintained through a pair of bolts 72 for each positioner block.

Each positioner block 56 has a central aperture generally radially disposed with respect to the aperture 42. The face of each positioner block remote from the aperture 42 has secured thereto a micrometer-like adjustment mechanism 74 rotatable about its axis in either direction to effect movement of its forward end axially, toward or away from its adjacent edge of the drill plate 40. The axially shiftable end of the adjustment mechanism includes an initial cylindrical member 76 with its remote end rotatably received in a slide plate 78 which is connected to the adjacent edge of the drill plate to effect drill plate shifting.

The threaded members 64 and nuts 66 associated with the clamp blocks 54 may be loosened to thereby allow movement of the side plates by rotation of the micrometer-like devices. This, in turn, will allow shifting of the drill plate 40 with its aperture 42 in one direction or another in the plane of the drill plate 40. Universal movement of the drill plate is thus possible in the plane of the tool ball pad 26 and jig surface. After each such adjustment, the clamp blocks 54 secure the drill plate 40 to the base plate 12 through threaded members 64 for a optical sighting. Set screws 38 in the threaded apertures 36 are utilized to secure threaded members 64 against rotation and inadvertent movement of the components. The threaded members 64 are thus staked by set screws 38.

The method of operation and use of the present invention includes placing a tool ball pad 26 on the rough structure of the jig 20 such that the length and the width are roughly coincident to the two axes of concern of the referenced system of the jig 20. Insurance is made that the center of the pad 26 is within 0.25 inches in both axes of desired location. The pad 26 is then attached to the jig using dowels 46 and bolts 48. The positioner 10 is then attached to the jig 20 using set screws 34.

A flush target 44 with a 0.25 inch diameter st is placed inside the aperture 42 in the drill plate 40 for sighting purposes. The clamp blocks 54 are moved appropriately by the rotatable cylindrical portions of the micrometer-like adjustment mechanism 74 to satisfy the designated position of the target. Location can be monitored using computer aided theodolites or conventional optics with transits and levels.

Once the desired position is obtained, the clamp blocks 54 are tightened down to the drill plate 40 by their nuts 66. The hole is then drilled into the tool ball pad 26 and reamed to 0.250 inches, using the aperture 42 as a drill guide. The positioner 10 is then removed and the tool ball pad cleaned up and deburred adjacent to the hole. Lastly, a tooling ball or an optical target ball may be inserted into the drilled hole of the tool ball pad to verify the hole location, once again preferably using computer-aided theodolites or standard optics.

In accordance with the present invention there is a significant reduction in the time required to locate the hole. It should take an inexperienced jig builder one-half hour to position and drill a hole in a tool ball pad versus two and a half hours to position a previously existing hole in a tool ball pad and then attach the pad to the jig. Since the tool ball pad is fastened to the structure prior to the targeting in the present invention, the problem of shifting after fastening will not manifest itself.

The present invention features fine thread positioning of independent axes to obtain precision movement. The positioning details and integral clamps effectively eliminate potential for shifting during the drilling operations. Integral clamps and set screws eliminate the need for obtaining noncompatible support hardware, i.e., clamps and hammers.

Lastly, the one inch deep drill block and drill bushings eliminate the need for skilled labor to produce a hole normal to the tool ball pad. Additional depth will prevent the drilled holes from being non-concentric with the hole in the drill block.

The present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,
What is claimed is:

1. A method of drilling a hole in a tool ball pad blank secured to a jig at a precisely predetermined location comprising:
    providing a base plate, a drill pate having means forming a reference hole therein and a target,
    said base plate having a thickness approximately equal to the height of said pad blank and,
    forming an aperture in said base plate having generally the same dimension as said ball pad blank for permitting the said base plate to be slidably received about said ball pad blank,
    providing said drill plate with means forming a reference hole therein,
    positioning a target in the reference hole of the drill plate,
    optically sighting the target while in the reference hole of the drill plate,
    adjusting the drill plate with respect to the base plate, pad and jig until the target has been moved to the precise determined location overlying the location to be drilled,
    positively securing the base plate with respect to the jig and tool ball pad blank secured thereto,
    removing the target from the reference hole in the drill plate,
    drilling the tool pad blank through the reference hole in the drill plate,
    removing the base plate, drill plate, and other parts from the drilled pad blank, and
    placing a tool ball into the drill pad blank.

2. Device for positioning a drill for drilling a tool ball pad blank permanently secured to a jig in a predetermined position thereon for receiving a tool ball, comprising:
    a base plate having a thickness approximately equal to the height of said pad blank,
    aperture means in said base plate having generally the same dimension as said ball pad blank for permitting the said base plate to be slidably received about said ball pad blank,
    means for securing the base plate and pad together at the margin of said aperture means,
    a drill plate having means forming hole therein for removably receiving a target and serving as a drill blank for the guiding of a drill,
    a target temporarily positioned in said hole,
    positioning means mounted to the base plate for moving said drill plate laterally over the upper surface of the pad blank until said target is in a precisely determined position,
    clamp means attached to the base plate for securing the position of said drill plate for drilling a precisely positioned hole into the pad blank through the reference hole, said drilled hole to serve to receive a tool ball after removal of said device from the jig.

3. The device as set forth in claim 2 wherein the positioning means for mounting the drill plate includes a pair of positioner blocks located adjacent to two adjacent side edges of the drill plate, each positioning means including a micrometer device for moving the positioner blocks and the drill plate in one predetermined direction.

4. The device as set forth in claim 3 wherein the means to releasably clamp the drill plate includes two clamp blocks adjustably secured to the base plate for clamping two adjacent edges when the drill place has been positioned.

5. The drill as set forth in claim 4 wherein the clamp blocks are secured to the base plate by staked threaded members and nuts, said blocks having elongated slots therein through which the threaded members entered.

* * * * *